2 Sheets—Sheet 1.
R. DICK.
ADDRESSING MACHINE.
No. 1,679. Reissued May 31, 1864.
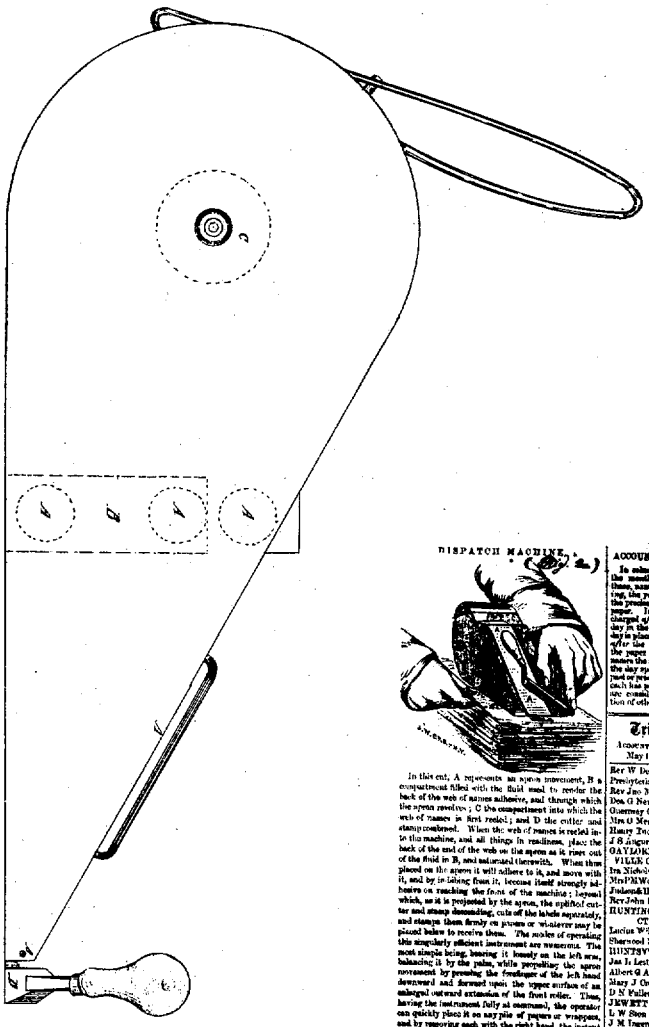
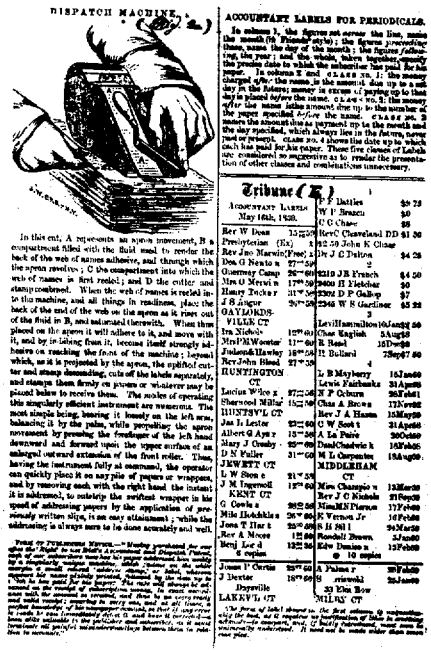
G. E. Smith
G. H. Clarke
W. Bruce
Robert Dick
THE NATIONAL LITHOGRAPHING COMPANY,
WASHINGTON, D. C.

2 Sheets—Sheet 2.
R. DICK.
ADDRESSING MACHINE.
No. 1,679. Reissued May 31, 1864.
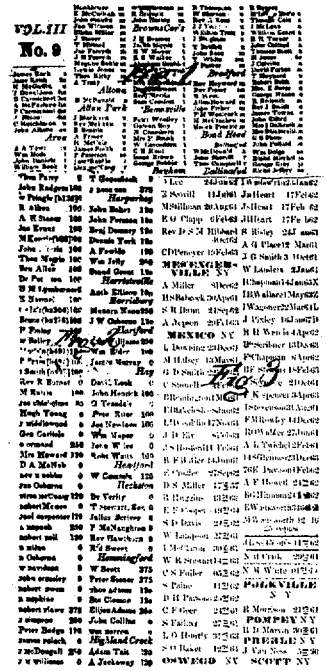
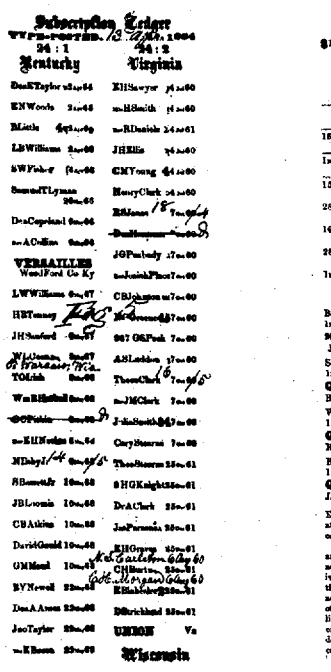
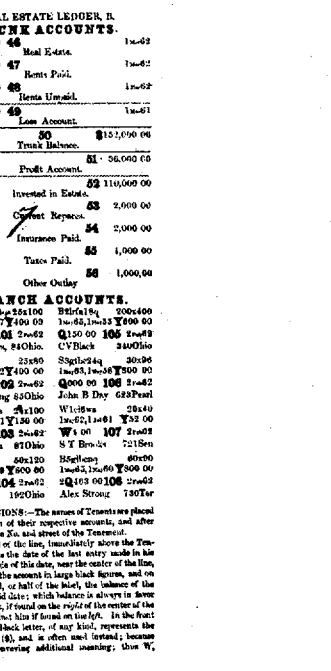
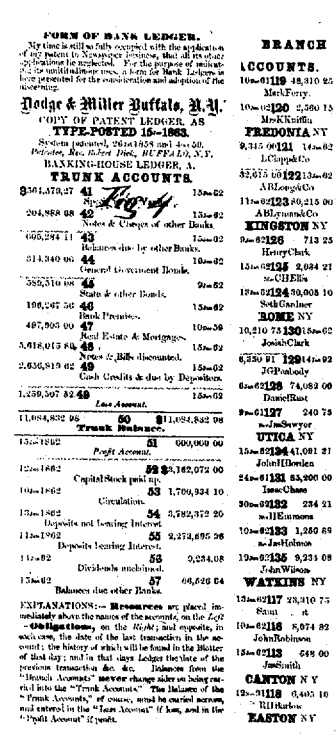
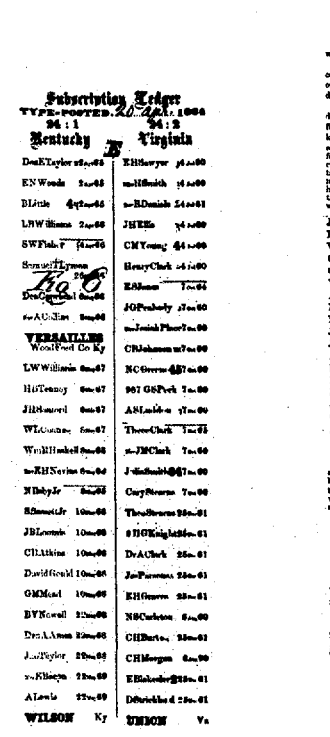
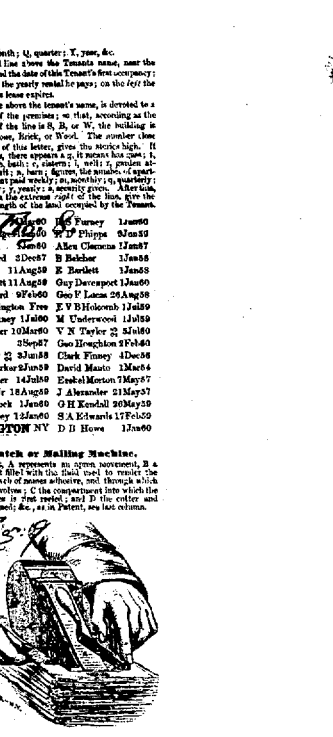

UNITED STATES PATENT OFFICE.

ROBERT DICK, OF BUFFALO, NEW YORK.

IMPROVEMENT IN ACCOUNTANT-LABELS FOR PERIODICALS, &c.

Specification forming part of Letters Patent No. 25,635, dated October 4, 1859; antedated July 26, 1859; Reissue No. 1,679, dated May 31, 1864.

*To all whom it may concern:*

Be it known that I, ROBERT DICK, of the city of Buffalo, in the county of Erie and State of New York, and formerly of the city of Toronto, Canada, have invented an improvement in the method of keeping accounts-current, and of so combining the accounts of subscribers to newspapers and other periodicals, &c., with their personal addresses as to enable publishers, &c., to put every subscriber's account simultaneously with his address on every paper sent him; and I do hereby declare that the following is a full and exact description thereof, reference being had to the accompanying drawings and representations, forming a part of this specification.

The names and the addresses of all parties whose accounts it is desired thus to keep are first carefully set up in printer's type, or their equivalents, in regular columns or otherwise, and in connection with each name a statement of the individual's account, or of the balance thereof, in figures, symbols, dates, or numbers, used either separately or in combination, or whatever else will represent the extent to which each individual is debtor or creditor, as represented indicatively by Figures 1, 2, 3, 4, 5, 6, 7, and 8 on the drawings. From the types thus carefully and fully set in order an impression is taken, which represents in print the accounts as set in type. On this impression, placed conveniently for reference and properly secured for careful preservation, accountant enters, in a manner similar to that in which corrections are usually made on proof-sheets by printers, as shown in Fig. 5 on the drawings, all the alterations or changes occurring in the state of the accounts up to the time fixed upon for readjusting the type, the form or forms of which are kept always standing and never thrown down, but ever ready to receive the incorporation of new or recent transactions at any time whenever a revised version of the printed accounts may be wanted, to secure which the type must be first corrected or revised in accordance with all the entries found marked on the impression last used as a ledger in recording the business transactions of its allotted period. A form of type adapted to be thus used I call a "type" or "metallic" ledger, and the revising process above described I call "type posting," the reasons for which are abundantly obvious, inasmuch as they assist all in readily perceiving and appreciating the nature and novelty of this my invention in the "method of keeping accounts-current," &c.; and that my improvement renders it easy for any firm, no matter how numerous its accounts, to open, if it pleases, a new ledger every morning and place a perfect copy of it in the hands of every clerk, should it be deemed desirable, for each day's business, by my invention, can be easily type-posted in the evening, and then one or many copies of the new version printed from the metallic ledger for use on the following day, and this continued would produce a daily succession of printed ledgers, or rather of versions of the same ledger, each one complete for its day.

The successive versions of the ledger taken according to this invention may be printed at regular intervals of time, or at such times as the nature of the business demands, making the succession one of periods short, long, or variable, according to circumstances.

Fig. 5 on the drawings represents an impression taken from a metallic ledger, with the changes occasioned by the current of business marked thereon with the pen, and which make type-posting necessary before a correct new version of the ledger can be obtained. Fig. 6 represents an impression the immediate successor of Fig. 5. The wave-lines seen therein over a few of the accounts point out or guide the eye to those accounts which underwent a change in the last type-posting process.

The removal of the short wave rules which produced the printed wave-lines must be the first thing done in the next type-posting process, in order that they may be used without confusion in marking the new changes. Any symbol may be used in marking the changes; but where there is room it is best to insert figures or numeral slugs in regular order; then, if the bookkeeper numbers the several packages of vouchers to correspond, the auditors will be able to accomplish their work with great accuracy and dispatch.

From the description already given of this improved method of keeping accounts-current it will be observed, first, that each impression or printed version of any given ledger presents a statement of the result of all the previous transactions had in the several accounts, giving all the balances as they then stood; second, that all those accounts in which no transaction had occurred appear in the new impression or printed version precisely as in the one immediately preceding it; third, that the various transactions which produce the successive balances in any individual account are not brought together, as in ordinary ledgers kept in writing, but lie scattered through the successive impressions or printed versions where first recorded, and when wanted must be found by the reference dates which connect all the transactions in each account, and which, by giving the day of each transaction, furnish a ready reference to its full history in the day-book or blotter; fourth, that this improved method of keeping accounts-current typographically completely obviates the necessity of placing them far apart, as in written ledgers, giving one or more pages to each to secure room for all the transactions of a long period—always necessary in order to escape the frequent repetition of the great labor of opening a new written ledger; fifth, by having the ledger of any particular period show as to each individual account the most recent transactions only with the resulting balance, or the balance alone, the accounts are brought so near together—sometimes a thousand onto a single page—rendering it not only practicable, but easy, to set the whole in type, which, being made to incorporate from time to time all the new transactions occurring in each interim, the hitherto heavy undertaking of opening a new ledger is reduced by this invention to the insignificant task of taking an impression from a type form. This being repeated often produces a connected chain of printed ledgers, or of versions of the same ledger, as already stated, each of which presents or exhibits the balances of all the accounts at the time it was printed, either with or without a statement of the most recent transactions had in each account, while the whole of the impressions, taken together, exhibit the complete account of each and every individual with whom transactions are had.

It will thus be seen that this my improved method of keeping accounts-current does not consist merely in their being printed, but involves the keeping of so much of the whole body of the accounts as contains the most recent transactions or last balances of all the accounts standing in type, ready to receive by incorporation all the business transactions of any specific period, and the taking of an impression from the type as often as it is made to incorporate the transactions of any period, thus producing a connected chain of impressions from the type, all of them versions of the ever-abiding metallic ledger, each version being the business ledger of entry only till its successor is printed, and no longer, and exhibiting only for the brief period in which it is so used the true balances of all the accounts, either with or without a statement of the most recent transactions had in each account, while the whole of the impressions or versions, taken together, exhibit the complete account of each and every individual, giving in connection with every type-posting change occasioned by any transaction the precise date of the previous one, by which all the various transactions, with the full history of each in the blotter, can be readily traced back, even to the origin of the account in every case.

While great brevity is thus aimed at in the management of the ledger, let it be observed that there is no limit to the extent to which details may be given by this improved method of keeping accounts-current.

In banking and similar institutions it will be especially desirable to insert a numeral slug wherever a change is made in the metallic ledger during any type-posting process. Then a simple comparison of the new version with its immediate predecessor will enable the auditors to satisfy themselves whether any change had been made where a numeral slug had not been inserted. Then by taking up the vouchers or packages of vouchers in their numerical order, and comparing them in each case with the correspondingly-numbered change in the new version of the ledger, they can, with comparatively little labor and expenditure of time, effect a perfect audit every evening of all the accounts, and in addition every auditor may take home a copy of the ledger with him every night to be filed for further quiet inspection to whatever extent he may deem it necessary.

Another very important peculiarity of this my improvement in the method of keeping accounts-current, &c., consists in enabling the book-keeper to render to the proper parties all the balances at the close of every audit, if need be, at the rate of one thousand accounts an hour, for as soon as the audit following any type-posting process is completed he has only to take an impression in addition to the one required for the printed ledger set, and cut its columns, as where marked by the red line E in Fig. 7 on the drawings. When thus separated, the head of each succeeding column may be pasted to the foot of the one preceding it till all the columns form one continuous web, this web being reeled, like the paper web of the telegraph operator, into the machine, which is a component part of this invention, and necessary to the carrying out of its objects. The book-keeper instructed in the uses of this machine is able to run the web of accounts and addresses through its pasting, cutting, and stamping arrangements at the rate already indicated, so as to make it put the ledger balance on an explanatory card, and the name and the address of the party to whom it is to be sent on the envelope which is to receive the card.

This my machine mode of rendering accounts-current is so rapid that it is found to be admirably adapted to the work of addressing periodicals of all kinds, as heretofore stated.

The best form of accounts for periodicals of all kinds is probably a statement of the date to which each subscriber has paid for his paper, as this form of account requires no process of reasoning in order to determine how far it is in arrears or paid in advance.

It is obvious that any of my type-posted metallic-ledgers could be used in printing their several accountant-addresses directly on the papers themselves, and in inventing them it was my first intention to so use them, but after much study finally abandoned, in order to have my accountant-addresses printed in the best manner on a press in the usual way, where the conditions of good printing can be observed, and then, after being well printed, have them applied in plain sight, face up, on the face of the paper, and so as to involve only one move of the paper, in addressing papers folded and piled, the result being the greatest attainable legibility, accuracy, and speed.

To understand the construction and operation of the machine, whereby the columns of impressions from my metallic ledgers are coated with paste, all the accounts cut off separately in succession, and made to completely address papers, &c., at the great speed already stated, let A in the accompanying drawings, as seen on Fig. 9×, represent an apron-movement of four rollers, one, $A'$, close to the cutter-stamp in front of the machine, the second, $A^2$, over the front edge of the paste-vessel B, over which the apron A A, when in motion, turns down into the paste. The third, $A^3$, roller, made of lead, is simply suspended in the lower fold of the apron, thus giving it the requsite tension, while it is kept from touching the bottom of the paste-vessel B by the fourth roller, $A^4$, which is above the second, and so placed as to effect the further purpose of keeping the surfaces of the apron apart, that its motion may not be impeded. The compartment marked B is the vessel into which the paste is poured which renders the back of the web adhesive, and through which the apron revolves. C is the compartment into which the web of accountant-addresses is first reeled, and D the cutter and stamp combined, formed of two pieces of cast-steel. The first, taken from a quarter-inch bar, is fashioned into the limb of a shear, and, with its forward upper edge formed for cutting, is firmly fastened to the front of the machine. The second limb is formed of a half-inch or inch bar, so fitted and screwed to the first limb as to form with it a cutting-shear, while it still retains its general shape as a piece of a square bar of steel, the inner lower corner of which is made to cut, and the bottom to stamp, at every stroke, for when the web of accountant-addresses is reeled into the machine, and all things in readiness, the back of the end of the web being placed on the apron as it rises up out of the paste, fully coated therewith, the web necessarily adheres to the apron, and hence moves forward with it till it reaches the front of the instrument, where the apron, turning suddenly round a small quarter-inch roller, parts company with the paper web, for, being too stiff, as it always should be, to follow the apron in this sudden turn, it goes off at a tangent and falls on the stationary limb of the cutter. Over this, as soon as it has passed the desired distance, be it the breadth of one printed line or more, the second limb of the cutter, till now upheld by the right hand or by a spring attached to the machine, is brought down suddenly on the printed line or lines, projecting over the stationary limb, (which now rests on the article to be addressed, and on the precise spot, keeping the accountant address or label up about a quarter of an inch from it,) and so suddenly that the atmospheric air between the lower face of the label and its bed presses the label up against the flat bottom of the descending cutter stamp, so that the label comes flat on its bed, and is stamped down upon it by the same stroke which cut it off from the web, while the paste under it, borrowed from the apron, binds it fast to the paper, to which it becomes an attractive address or direction, fit to carry it to the ends of the earth, and there to tell faithfully whatever facts it may have in charge.

The machine thus described may be operated in many ways, as bearing it loosely on the arm; connecting it with fixed slides, horizontal or perpendicular, coupled with springs or weights; supplying it with articles to be labeled or addressed by the aid of apron-movements, elevators, or their mechanical equivalents; gearing it so as to make the rising of the cutter-stamp project the labels, so as to fit the machine to be operated by one hand or by machinery.

I do not claim the process of printing, or the use of types and a printing-press, or its equivalents, in printing accounts; neither do I claim any particular theory or principle of book-keeping; but

What I claim as my invention is—

1. The method of keeping accounts-current by means of successive impressions taken from a form or forms of type, or its equivalent, into which the current transactions of any business are type posted from time to time, introducing the novelty of a metallic or type ledger so representing all accounts and so incorporating all current business transactions as to render the further use of written ledgers unnecessary, printed versions of the metallic ledger being used instead, for counting-room and all similar purposes.

2. The printed ledger or record herein described, consisting of a succession of impressions or versions and taken from the type or metallic ledger, at regular or irregular intervals, each impression or version showing the several transactions or the balances of each individual account, substantially as herein described. (This claim includes the use of any such impression or impressions for ledger or counting-room purposes.)

3. The use of all such impressions for rendering or transmitting accounts, or for addressing or directing newspapers or other periodicals to subscribers or others, whether applied to the papers directly from the type or intermediately by impressions previously taken or otherwise, substantially as herein described.

4. In connection with newspaper and all similar business, the combination, in print, of a subscriber's address, with a statement of his subscription-account in the form of the time to which it is paid or otherwise, substantially as herein described.

5. The method of cutting off from a printed column or web of columns such addresses and accounts and affixing them separately to newspapers or other periodicals, or to cards and envelopes, by means of a machine, substantially as herein set forth.

6. The machine herein mentioned and its uses, as shown, operating substantially as described.

ROBERT DICK.

Witnesses.

MARCUS P. NORTON,
CHARLES E. FOSTER.